United States Patent
Bhosle et al.

(10) Patent No.: US 11,424,982 B2
(45) Date of Patent: Aug. 23, 2022

(54) REMEDIATION OF A SYSTEM TO NEW DESIRED STATE USING CONFIGURATION DEPENDENCY GRAPH

(71) Applicant: VMware, Inc., Palo Alto, CA (US)

(72) Inventors: Mayur Bhosle, San Jose, CA (US); Mukund Gunti, Sunnyvale, CA (US); Siddharth Gandhi, Cupertino, CA (US); Diana Vinu Chris, Dublin, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/156,489

(22) Filed: Jan. 22, 2021

(65) Prior Publication Data

US 2022/0239555 A1    Jul. 28, 2022

(51) Int. Cl.
| | |
|---|---|
| *H04L 41/082* | (2022.01) |
| *H04L 41/08* | (2022.01) |
| *H04L 41/22* | (2022.01) |
| *G06F 9/455* | (2018.01) |
| *H04L 41/084* | (2022.01) |

(52) U.S. Cl.
CPC ........ *H04L 41/082* (2013.01); *G06F 9/45558* (2013.01); *H04L 41/084* (2013.01); *H04L 41/0886* (2013.01); *H04L 41/22* (2013.01); *G06F 2009/45595* (2013.01)

(58) Field of Classification Search
CPC . H04L 41/082; H04L 41/084; H04L 41/0886; H04L 41/22; G06F 9/45558; G06F 2009/45595
USPC ....................................................... 709/220
See application file for complete search history.

(56) References Cited

U.S. PATENT DOCUMENTS

| | | | | |
|---|---|---|---|---|
| 9,916,551 | B1 * | 3/2018 | Bandopadhyay | H04L 41/145 |
| 10,116,509 | B2 * | 10/2018 | Purusothaman | G06F 3/0481 |
| 11,023,221 | B2 * | 6/2021 | Garvey | G06F 9/5055 |
| 11,023,289 | B2 * | 6/2021 | Shil | G06F 9/4881 |
| 2011/0258619 | A1 * | 10/2011 | Wookey | G06F 8/658 |
| | | | | 717/175 |
| 2014/0222521 | A1 * | 8/2014 | Chait | G06Q 10/0637 |
| | | | | 705/7.36 |

(Continued)

OTHER PUBLICATIONS

VRealize Suite Lifecycle Manager 2.1 Programming Guide, VMware vRealize Suite Lifecycle Manager 2018, Jul. 2019 (Year: 2019).*

*Primary Examiner* — David P Zarka
(74) *Attorney, Agent, or Firm* — Kim & Stewart LLP

(57) ABSTRACT

A method of remediating system services relies on a first dependency graph with super nodes, to each of which a set of system services are assigned, and second dependency graphs, each of which represents dependencies among the system services that are in one of the sets. The method includes the steps of: comparing an actual configuration state of the system services to a desired configuration state of the system services to identify configurations that are in drift; identifying system services corresponding to the configurations that are in drift; determining an order of updating configurations of the identified system services using the first and second dependency graphs; and applying the desired configurations of the identified system services in the order determined, wherein after the configurations of an identified system service are updated, the system service executes with the updated configurations.

20 Claims, 12 Drawing Sheets

(56) References Cited

U.S. PATENT DOCUMENTS

| | | | | |
|---|---|---|---|---|
| 2015/0280988 A1* | 10/2015 | Vorst | ................... | H04L 41/0886 |
| | | | | 709/220 |
| 2019/0007263 A1* | 1/2019 | Lahiri | ................. | G06F 11/1433 |
| 2020/0050444 A1* | 2/2020 | Nikam | ................ | G06F 11/1464 |

* cited by examiner

REMEDIATION OF A SYSTEM TO NEW DESIRED STATE USING CONFIGURATION DEPENDENCY GRAPH

BACKGROUND

A typical software stack for configuration management of a system includes an application programming interface (API) layer, which provides an endpoint to configure and monitor the system, a business logic layer, which contains the API implementation, and a persistence layer, which persists any configuration or state changes in the system onto a disk. In the typical system, configuration actions performed by an end user are not persisted while the system is live. It is thus impossible to determine the configuration tasks previously performed by the user, especially after a long period of time has passed since boot-up of the system. Rather, only the resulting state of those tasks is persisted. The system can thus only report the current configuration state, and it is impossible to revert to a certain configuration state. In fact, it is difficult to even revert to the initial default configuration state.

The inability to determine the configuration tasks previously performed is especially problematic if the user must manage the system at a large scale. As the number of configurations that must be set and monitored increases, the complexity of managing the system grows. Only ad hoc solutions are available, and such solutions only provide configuration and compliance support for a limited set of configurations.

As disclosed in U.S. patent application Ser. No. 16/837,676, filed Apr. 1, 2020, the entire contents of which are incorporated by reference herein, a system may be implemented that defines which properties need to be persisted upfront in a configuration schema. The configuration schema may define such properties as either configurations or states. A configuration is data that the user provides as part of a configuration action. A state is data that the system generates internally, the state being further classified as either vital or cached. The system persists configurations and vital states across reboots but does not persist cached states.

By defining properties using configuration schemas, configuration actions can be tracked by storing updates to configurations in a database. As a result, configuration changes can be easily detected while the system is live. However, the system may include many services, including network time protocol (NTP) service, secure shell (SSH) service, authentication service, firewall service, network service, storage service, keyboard service, etc. It is still burdensome for the user to manage the configurations for all these different services separately.

Additionally, many configurations have dependencies on each other. As such, when several configurations need to be updated, the system must be aware of these dependencies to update the configurations in the correct order. Updating configurations for system services out of order could result in failure of these system services. However, there may be hundreds of software development teams for thousands of system services, and it might be very difficult to coordinate among the software development teams to correctly determine the dependencies.

SUMMARY

Accordingly, one or more embodiments provide techniques to facilitate the determination of dependences among system services running in a cluster of hosts. According to one embodiment, a high-level dependency graph with super nodes is constructed. System services are assigned to one of these super nodes and dependencies among the system services are determined separately for each super node.

A method of remediating system services according to one or more embodiments relies on dependencies determined in the above manner. The method includes the steps of: comparing an actual configuration state of the system services to a desired configuration state of the system services to identify configurations that are in drift; identifying system services corresponding to the configurations that are in drift; retrieving a first dependency graph representing dependencies among the sets of system services; retrieving a plurality of second dependency graphs, each second dependency graph representing dependencies among the system services that are in one of the sets; determining an order of updating configurations of the identified system services using the first and second dependency graphs; and applying the desired configurations of the identified system services in the order determined, wherein after the configurations of an identified system service are updated, the system service executes with the updated configurations.

Further embodiments include a non-transitory computer-readable storage medium comprising instructions that cause a computing system to carry out the above method, as well as a computing system configured to carry out the above method.

DETAILED DESCRIPTION

Figure 1:
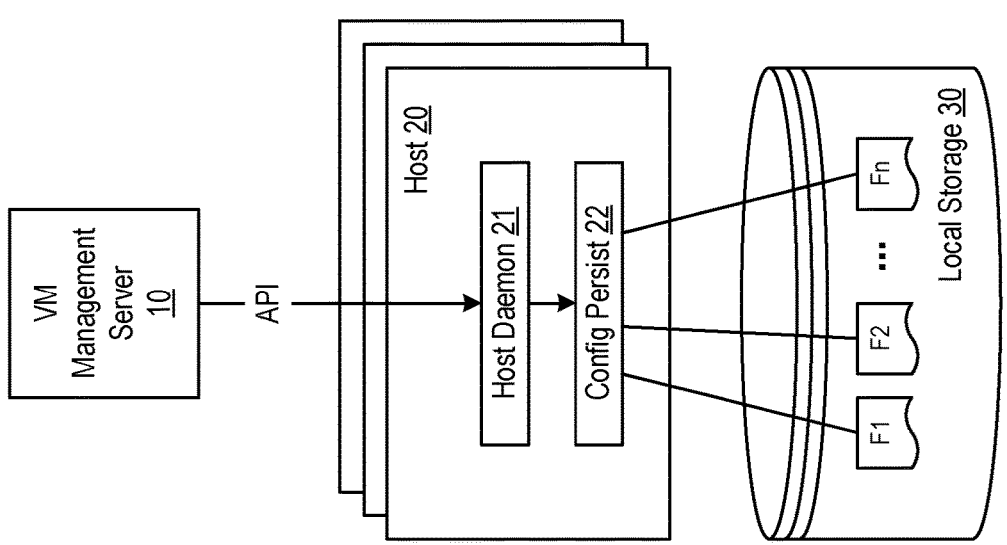
FIG. 1 is a block diagram of a virtualized computing system of the prior art in which configurations are persisted in files that are stored in local storage units.

FIG. 1 is a simplified block diagram of a virtualized computing system of the prior art in which configurations are persisted in files that are stored in local storage units 30. The virtualized computing system of FIG. 1 includes a virtual machine (VM) management server 10 that manages the lifecycle of VMs running in a cluster of hosts 20. To configure system services running in hosts 20, an end user operates a user interface (UI) (not shown) on VM management server 10 to make configuration API calls to hosts 20. A host daemon 21 running in each host 20 receives and processes these API calls. If an API call requires the virtualized computing system to set a configuration for a particular system service, host daemon 21 instructs a configuration persistence layer 22 in host 20 to persist the configuration in a local storage unit 30. The configuration is stored as a file in local storage unit 30 corresponding to the system service (i.e., file F1, file F2, ..., file Fn). For example, if the configuration for the system service is persisted in file F1, then the next time a host 20 executes the system service, host 20 executes the system service with the configuration stored in file F1.

Figure 2:
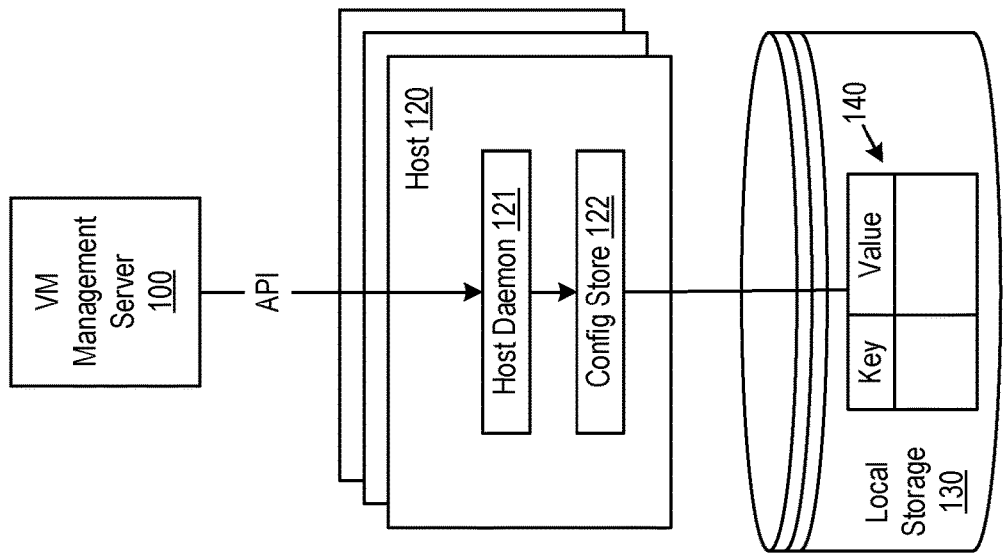
FIG. 2 is a block diagram of a virtualized computing system in which configurations are persisted in key-value stores provisioned in local storage units.

FIG. 2 is a simplified block diagram of a virtualized computing system in which configurations are persisted in key-value stores 140 provisioned in local storage units 130. The virtualized computing system of FIG. 2 includes a VM management server 100 that manages the lifecycle of VMs running in a cluster of hosts 120. To configure system services running in hosts 120, an end user operates a UI (not shown) on VM management server 100 to make configuration API calls to hosts 120. A host daemon 121 running in each host 120 receives these API calls and passes them to a configuration store 122 for processing. Configuration store 122 exposes configurations for different system services as configuration objects, each configuration object being backed by a corresponding configuration schema. Configuration store 122 records all updates to the configurations of system services in key-value store 140. In key-value store 140, a "key" corresponds to a system service, and a corresponding "value" for the key stores one or more configuration properties and one or more internal states for that system service.

Figure 3:
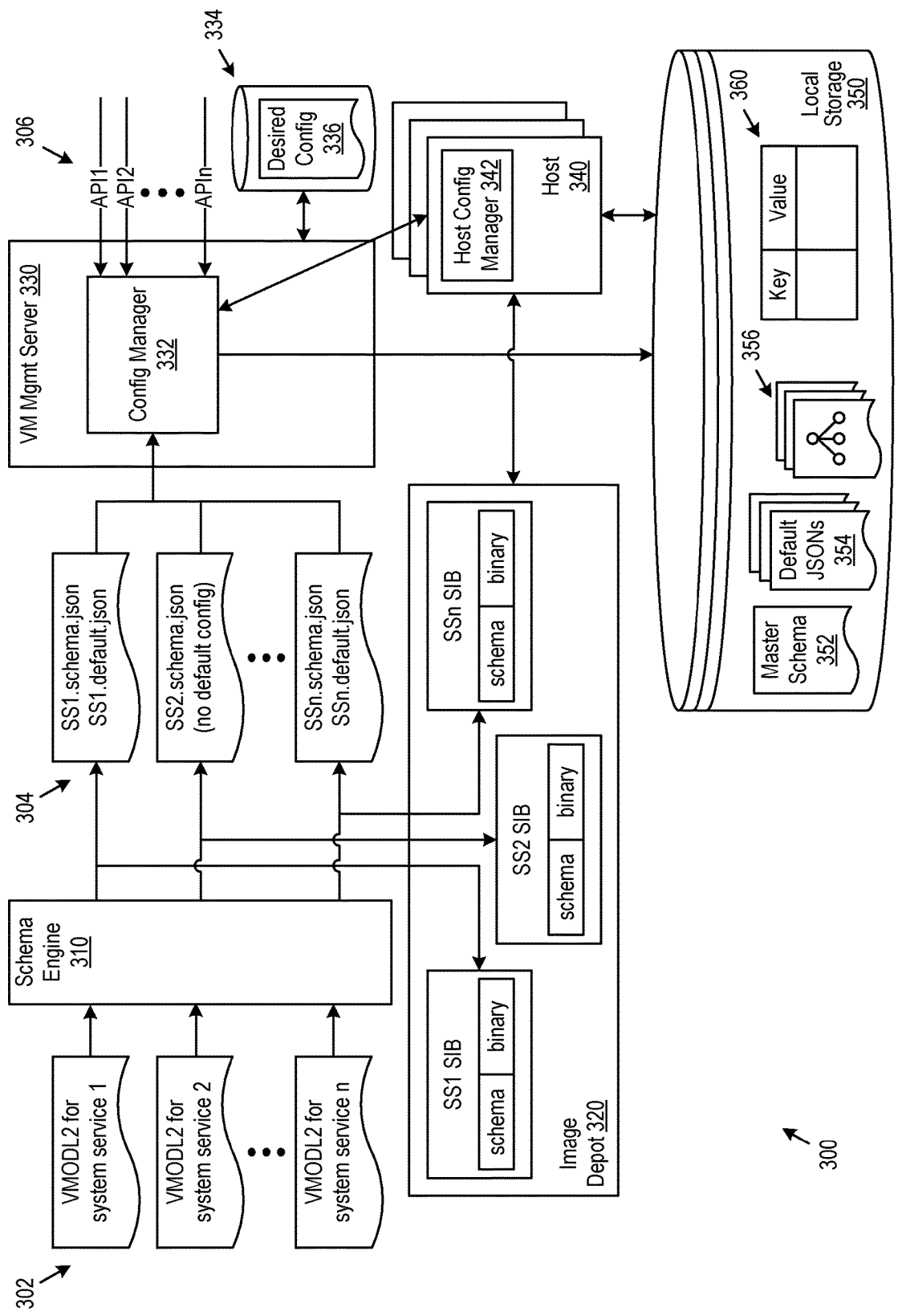
FIG. 3 is a block diagram of a computing system in which configurations are persisted in key-value stores provisioned in local storage units, according to embodiments.

FIG. 3 is a simplified block diagram of a computing system 300 in which configurations are persisted in key-value stores 360 provisioned in local storage units 350, according to embodiments. Computing system 300 includes a schema engine 310, an image depot 320, a VM management server 330, and a cluster of hosts 340.

In computing system 300, configurations for system services are defined in schemas. Software publishers of system services define the schemas in schema definition files, e.g., VMware Managed Object Design Language 2 (VMODL2) files 302. Each VMODL2 file 302 corresponds to a system service (i.e., system services 1 through n).

Schema engine 310 is a physical or virtual server that processes VMODL2 files 302 and generates schemas from the VMODL2 files. In the embodiments illustrated herein, the schemas are in the format of JavaScript Object Notation (JSON) files 304. For each VMODL2 file 302, schema engine 310 generates an individual JSON file, e.g., SS1.schema.json, referred to herein as a "configuration schema." Additionally, for each VMODL2 file 302 that contains a definition for a default configuration, schema engine 310 generates a default JSON file, e.g., SS1.default.json, referred to herein as a "default schema." A default schema for a system service contains the initial configurations for the system service, and a host 340 may revert to these initial configurations as described in U.S. patent application Ser. No. 16/837,760, filed Apr. 1, 2020, the entire contents of which are incorporated by reference herein. In the example given in FIG. 3, default schemas are available for system services 1 and n, but not for system service 2.

Image depot 320 is a storage service that stores software installation bundles (SIBs) for system services executed on hosts 340, i.e., "SS1 SIB," "SS2 SIB," and "SSn SIB." Each SIB contains the binaries for executing a system service on a host 340. Additionally, each SIB embeds JSON files generated by schema engine 310 in its metadata. For example, SS1 SIB contains the binaries for executing system service 1 and also embeds SS1.schema.json and SS1.default.json in its metadata.

Hosts 340 are servers that may be constructed on server grade hardware platforms such as x86 architecture platforms. Each host 340 contains a virtualization software layer (not shown) supporting a VM execution space for concurrently instantiating and executing VMs. Hosts 340 run system services based on configurations stored in key-value stores 360, which are persisted in local storage units 350.

Local storage units 350 are provisioned in shared storage that may comprise, e.g., magnetic disks or flash memory in a storage area network (SAN), and a separate local storage unit 350 is provisioned for each host 340. Each host 340 maintains its own key-value store 360 in local storage unit 350. In addition, each host 340 maintains a separate copy of master schema JSON file 352, default JSON files 354, and dependency graphs 356.

Master schema JSON file 352 is the master configuration schema of all system services running in hosts 340. Each default JSON file 354 is the default configuration schema for one of the system services and contains the default configuration for that system service.

Each dependency graph 356 is a data structure that defines dependencies either among system services or among sets of system services. System services are grouped into sets at super nodes, e.g., at a "Network" super node and at a "Storage" super node. When a system service is introduced, a developer of the system service must determine the super node the system service belongs to. The configurations of the system service then become child nodes of the selected super node. After this selection, the developer merely needs to identify dependencies within the set of that super node. For example, a network file system (NFS) system service and an Internet Small Computer Systems Interface (iSCSI) system service may both be included at the Storage super node. The developers of the NFS and iSCSI system services must identify, in "inner" dependency graphs, which should be updated first based on dependencies. However, these developers do not need to specify dependencies on all the system services outside of the Storage super node.

Figure 7:
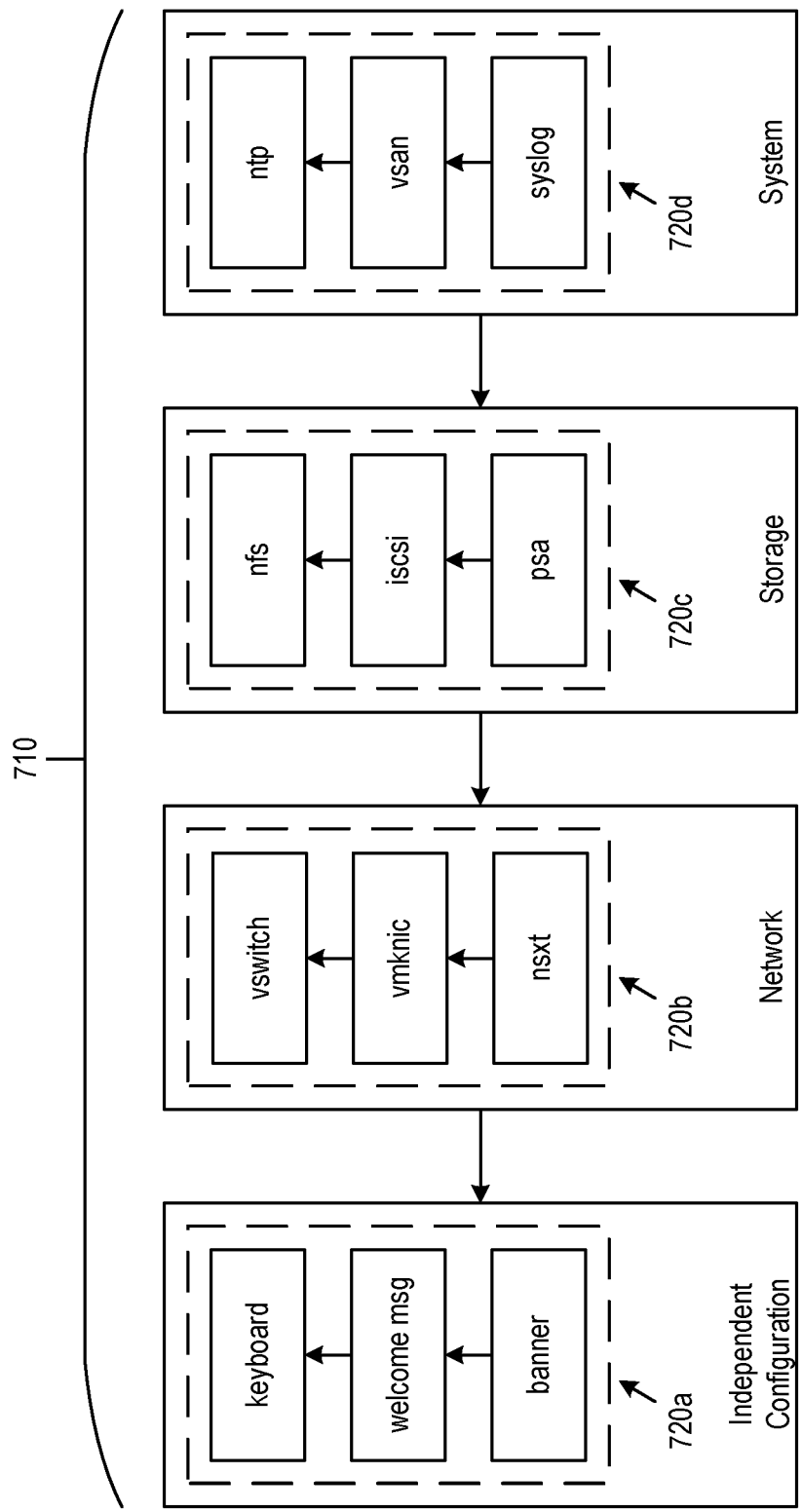
FIG. 7 is an example of dependency graphs for system services, according to an embodiment.

The dependencies among sets of system services are defined by a "high-level" dependency graph. For example, the Storage super node may be dependent on the Network super node. In this case, all the system services at the Network super node must be updated before any system services at the Storage super node are updated. Following the high-level dependency graph, configuration updates at the Network super node are applied before configuration updates to the NFS system service. The multiple levels of dependency graphs simplify the determination of an order for applying updates to configurations of system services running in hosts 340. This simplification further reduces the likelihood of applying configurations in an order that causes system services to fail. A simplified example of dependency graphs 356 is illustrated in FIG. 7.

Each key-value store 360 is a database in which a "key" corresponds to a system service, and a corresponding "value" for the key stores one or more configuration properties and one or more internal states for that system service. The current configuration state of the system services running in each host 340 is maintained in key-value store 360 corresponding to that host 340. "Drift" occurs when the actual configuration state, as persisted in key-value store 360, deviates from the desired configuration state, as defined in a desired configuration JSON file 336 of a local storage unit 334 accessible by VM management server 330. The user defines the desired configuration state in desired configuration JSON file 336 using APIs 306 as described below.

VM management server 330 is a physical or virtual server that manages the lifecycle of VMs running in hosts 340. VM management server 330 also manages installation and configuration of system services in hosts 340. During installation of system services, hosts 340 retrieve binaries of the system services from image depot 320 and load them into memory for execution therein, and configuration manager 332 extracts the configuration schemas and any default schemas embedded in the metadata of these system services. Configuration manager 332 generates master schema JSON file 352 from the configuration schemas of these system services and stores master schema JSON file 352 in local storage units 350. In addition, configuration manager 332 stores any default schemas in local storage units 350.

Each host 340 contains a host configuration manager 342 for accessing key-value store 360 in response to an "apply" API call received from configuration manager 332. To make the apply API call, configuration manager 332 accesses desired configuration JSON file 336 from local storage unit 334 and transmits desired configuration JSON file 336 to host configuration manager 342 along with the apply API call. In response to the apply API call, host configuration manager 342 checks for drift by comparing the desired configuration state expressed in desired configuration JSON file 336 with the actual configuration state, as persisted in key-value store 360. If there is drift in any of the configuration objects, a plug-in (not shown) in host 340 updates key-value store 360 to apply all the configurations that are in drift.

Figure 6A:
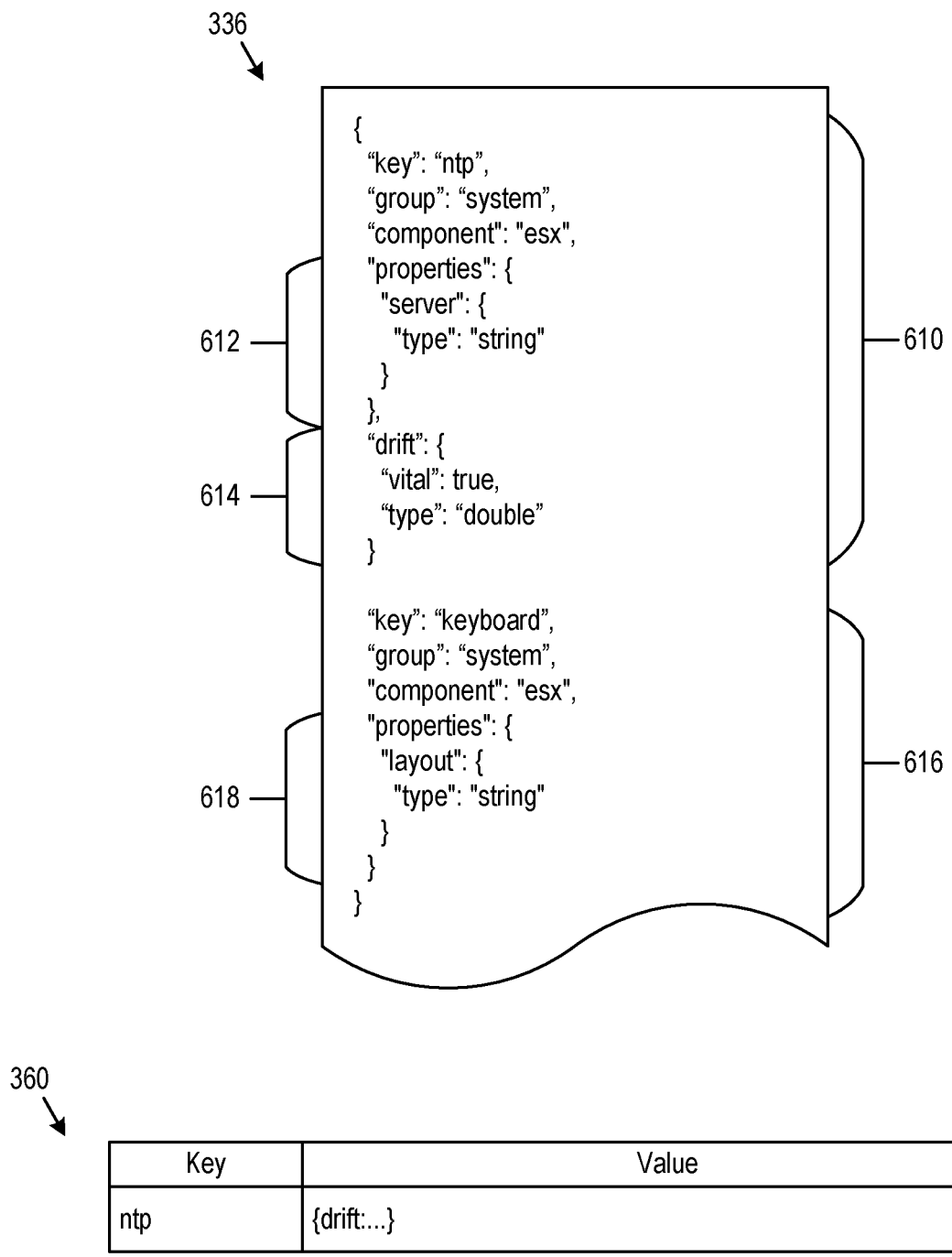
FIG. 6A is an example of a desired configuration JSON file and key-value store.

To configure system services running in hosts 340, an end user operates a UI (not shown) on VM management server 330 to make configuration API calls 306, which are exposed by configuration manager 332. Configuration API calls 306 include "set," "update," "delete," and "get" API calls. In response, configuration manager 332 updates desired configuration JSON file 336 and makes an apply API call to host configuration managers 342 running in hosts 340 to apply the configurations defined in the updated desired configuration JSON file 336, as illustrated in FIGS. 6C-6E.

Figure 6B:
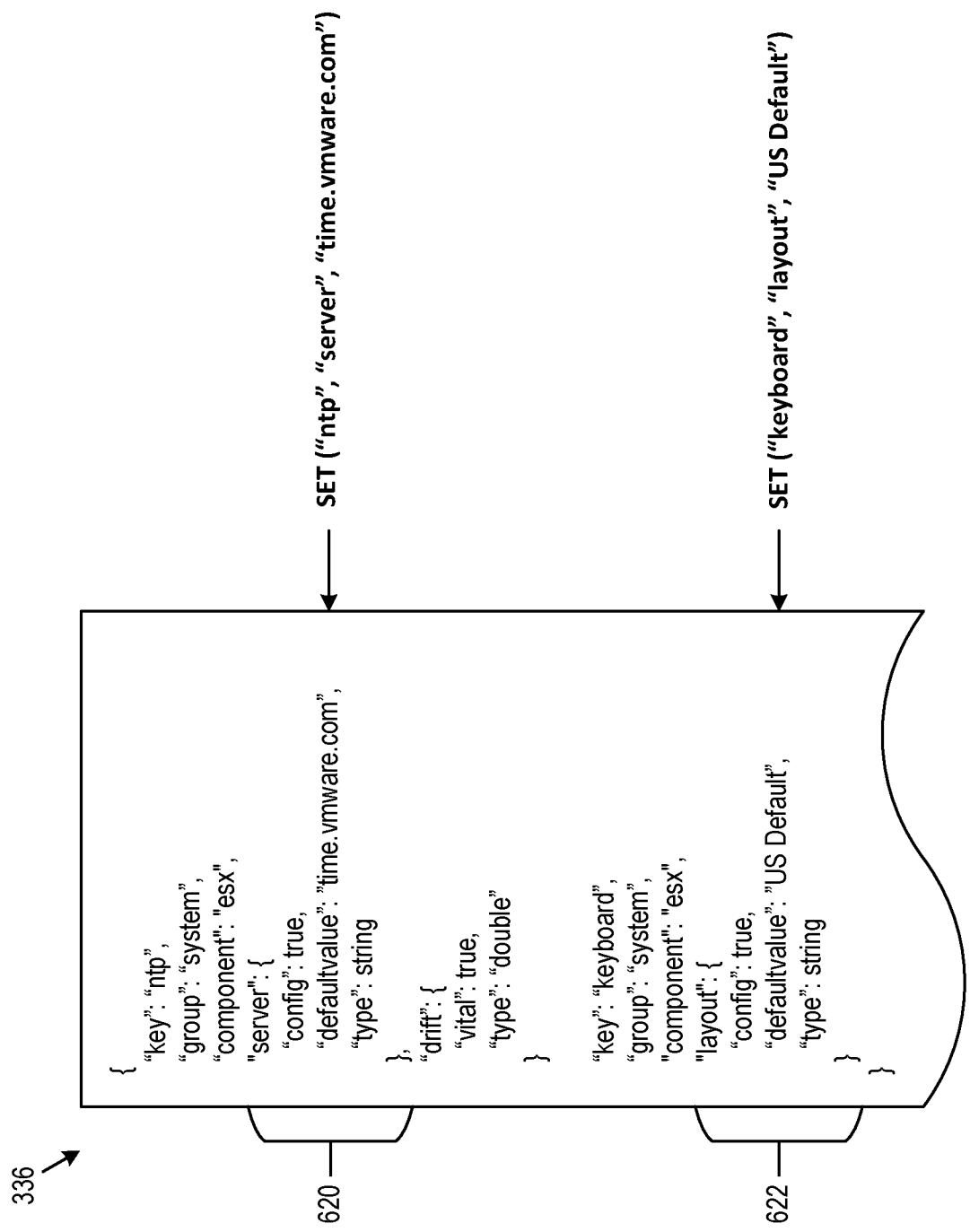
FIG. 6B is an example of a desired configuration JSON file after set API commands are executed.
Figure 6C:
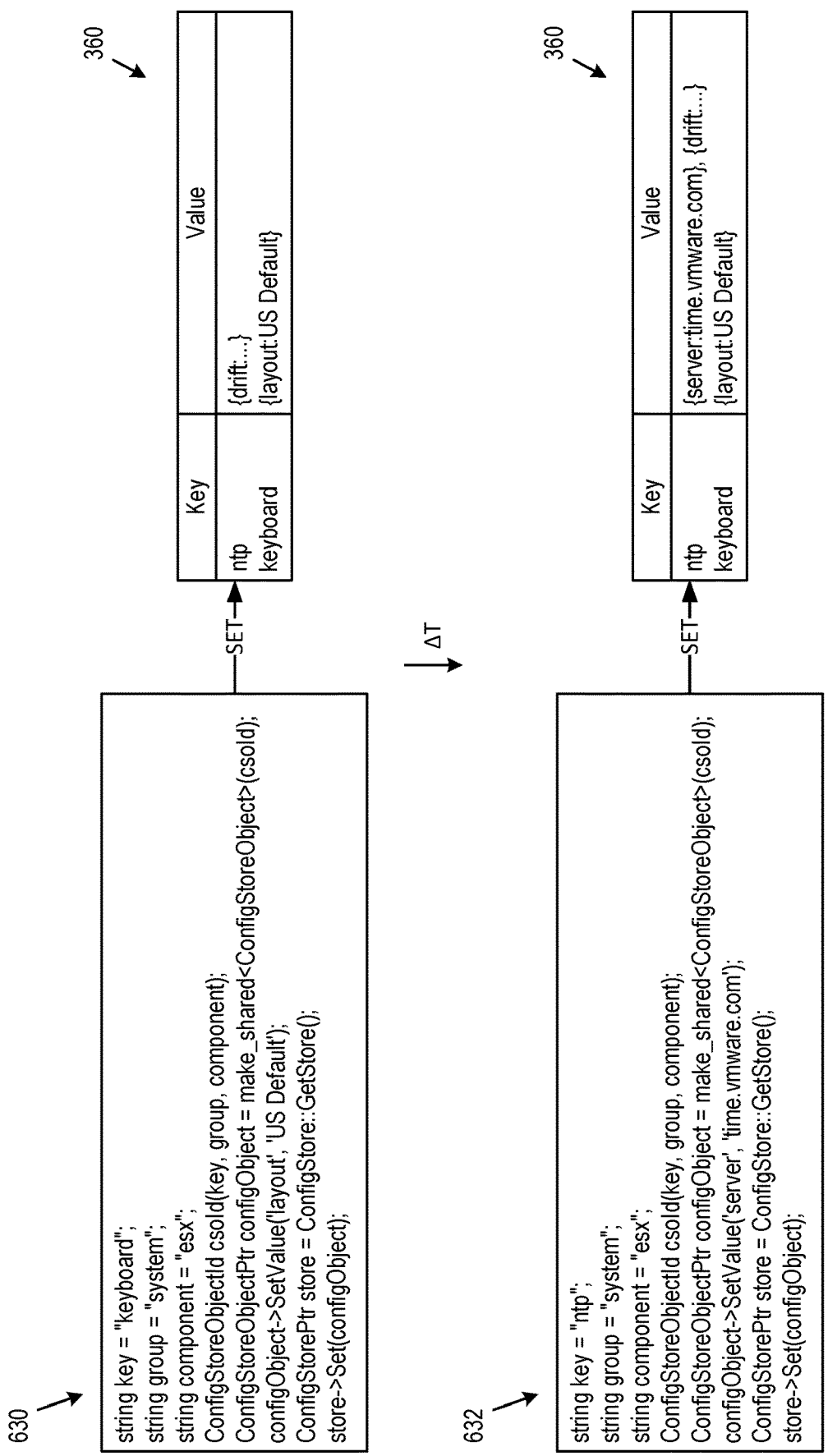
FIG. 6C is an example of a key-value store after a host executes set API commands in an order specified by dependency graphs.
Figure 6D:
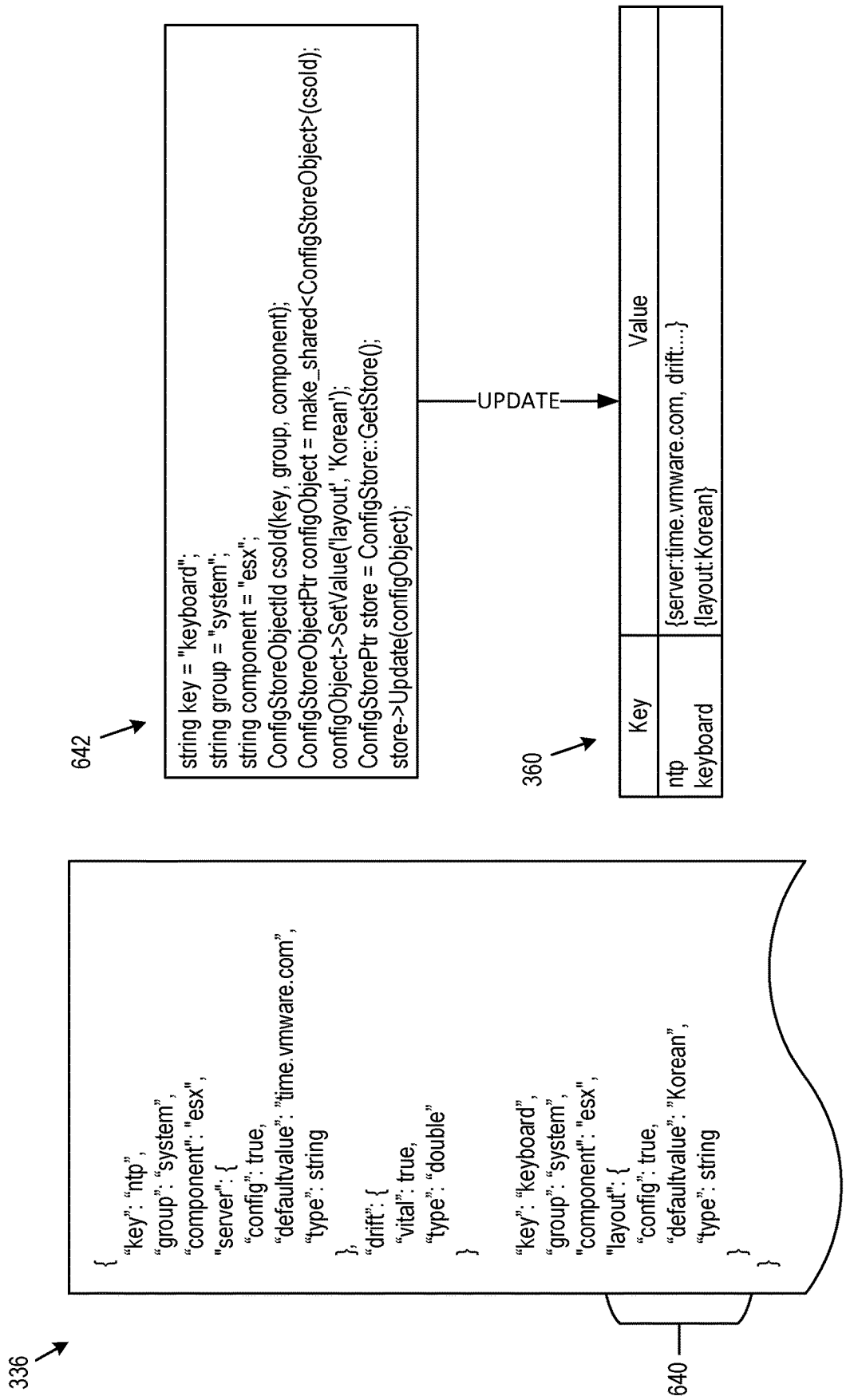
FIG. 6D is an example of a desired configuration JSON file and key-value store after update API commands are executed.
Figure 6E:
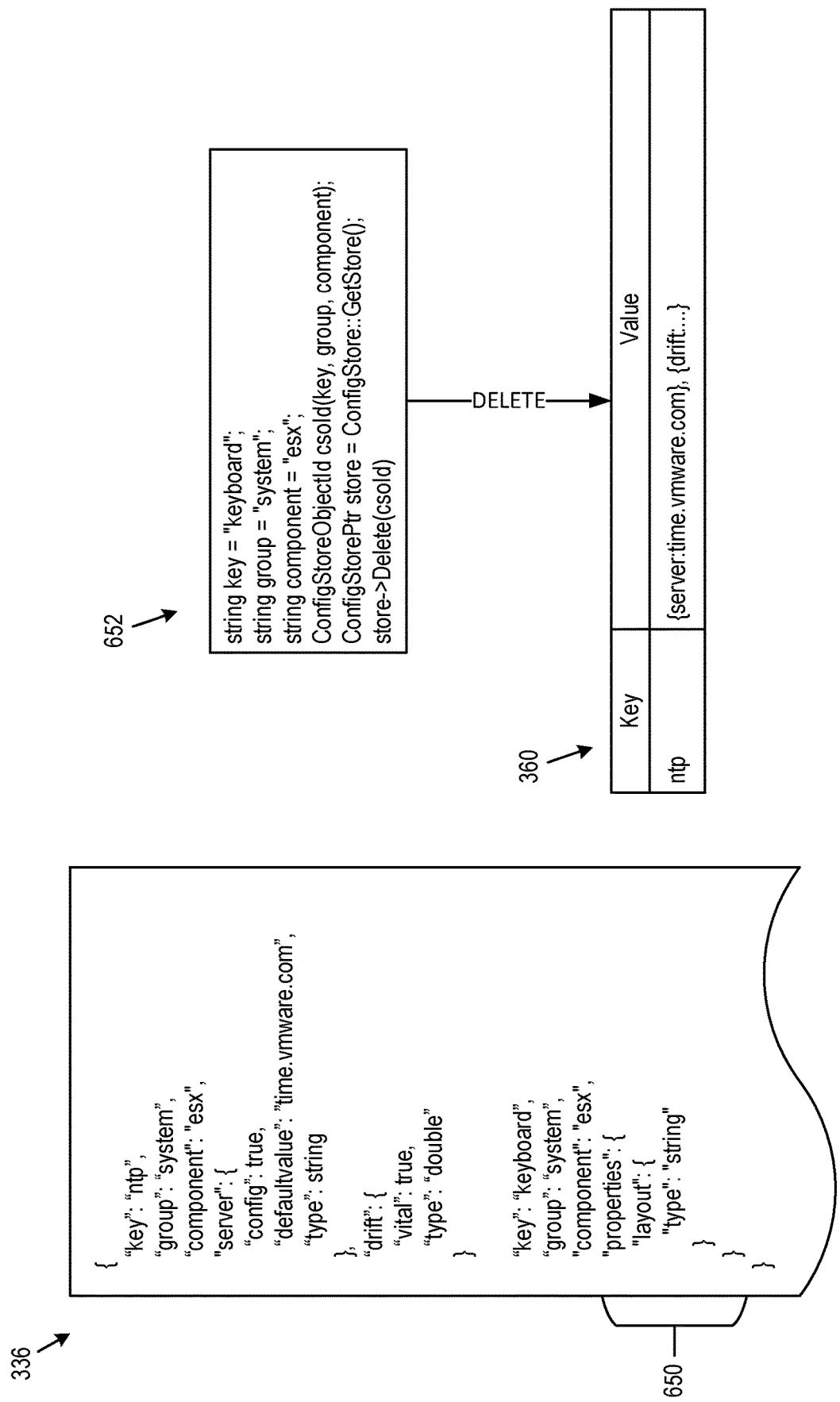
FIG. 6E is an example of a desired configuration JSON file and key-value store after delete API commands are executed.
Figure 6F:
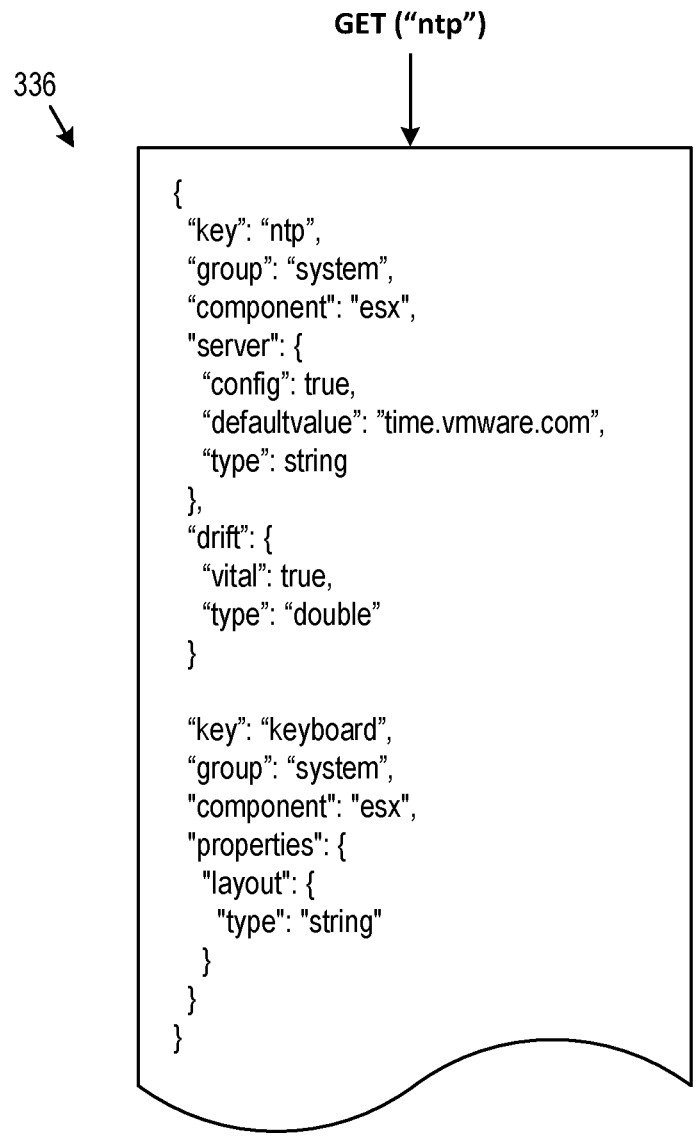
FIG. 6F is an example of a result of a get API command.

A set API call 306 creates or overwrites a configuration object in desired configuration JSON file 336 corresponding to the system service identified in the API call, as illustrated in FIG. 6B. An update API call 306 updates a configuration object in desired configuration JSON file 336 for the system service identified in the API call, as illustrated in FIG. 6D. A delete API call 306 deletes part of a configuration object in desired configuration JSON file 336 for the system service identified in the API call, as illustrated in FIG. 6E. Changes made to desired configuration JSON file 336 pursuant to set, update, and delete API calls result in changes to configuration objects in key-value store 360 via apply API calls. A get API call 306 retrieves a configuration object from desired configuration JSON file 336 for the system service identified in the API call, as illustrated in FIG. 6F.

Figure 4:
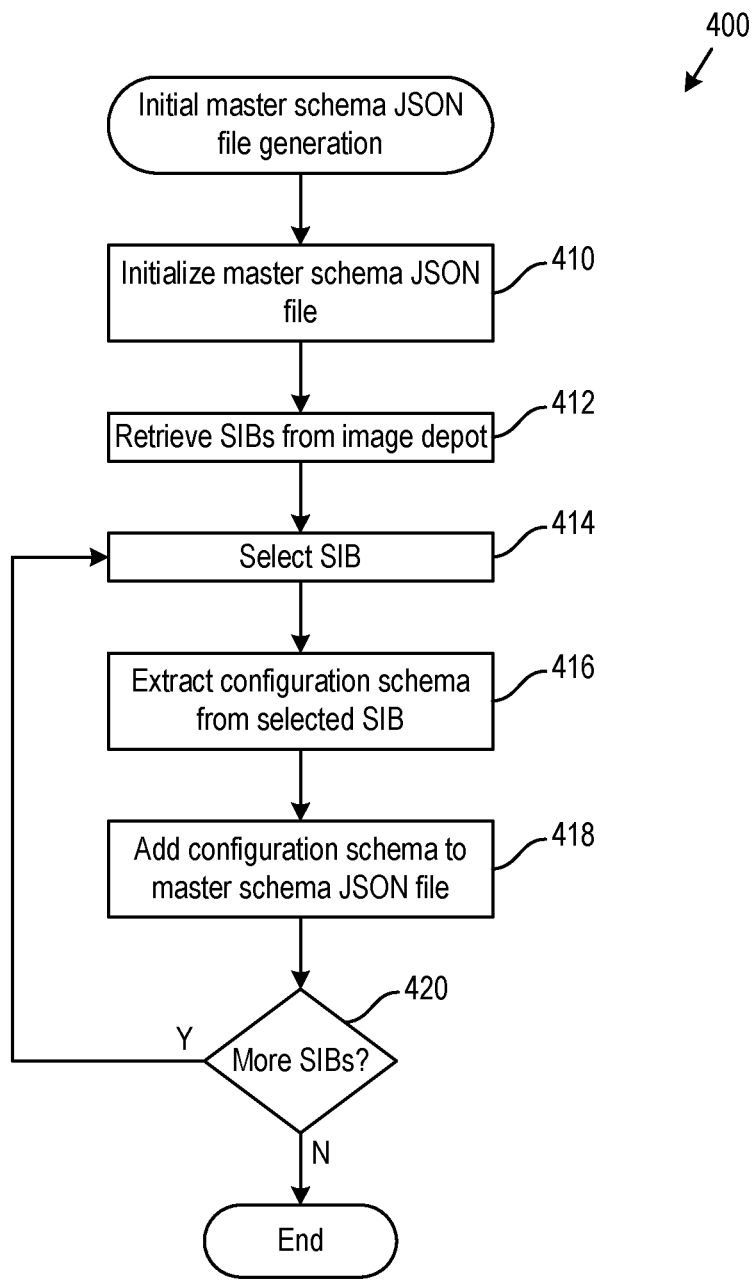
FIG. 4 is a flow diagram of a method carried out by a virtual machine management server to generate a master configuration schema, according to an embodiment.

FIG. 4 is a flow diagram of a method 400 carried out by VM management server 330 to generate an initial master schema JSON file 352, according to an embodiment.

At step 410, configuration manager 332 initializes a master schema JSON file 352 without any configuration schemas. At step 412, configuration manager 332 retrieves all the SIBs from image depot 320, each SIB containing a configuration schema for a system service embedded in its metadata.

At step 414, configuration manager 332 selects a SIB, e.g., SS1 SIB. At step 416, configuration manager 332 extracts the configuration schema embedded in the selected SIB, e.g., SS1.schema.json. At step 418, configuration manager 332 adds the extracted configuration schema to the master schema JSON file 352 initialized at step 410.

At step 420, configuration manager 332 determines if there is a SIB for another system service to extract a configuration schema from. If there is, then method 400 moves back to step 414. Otherwise, method 400 ends.

Figure 5:
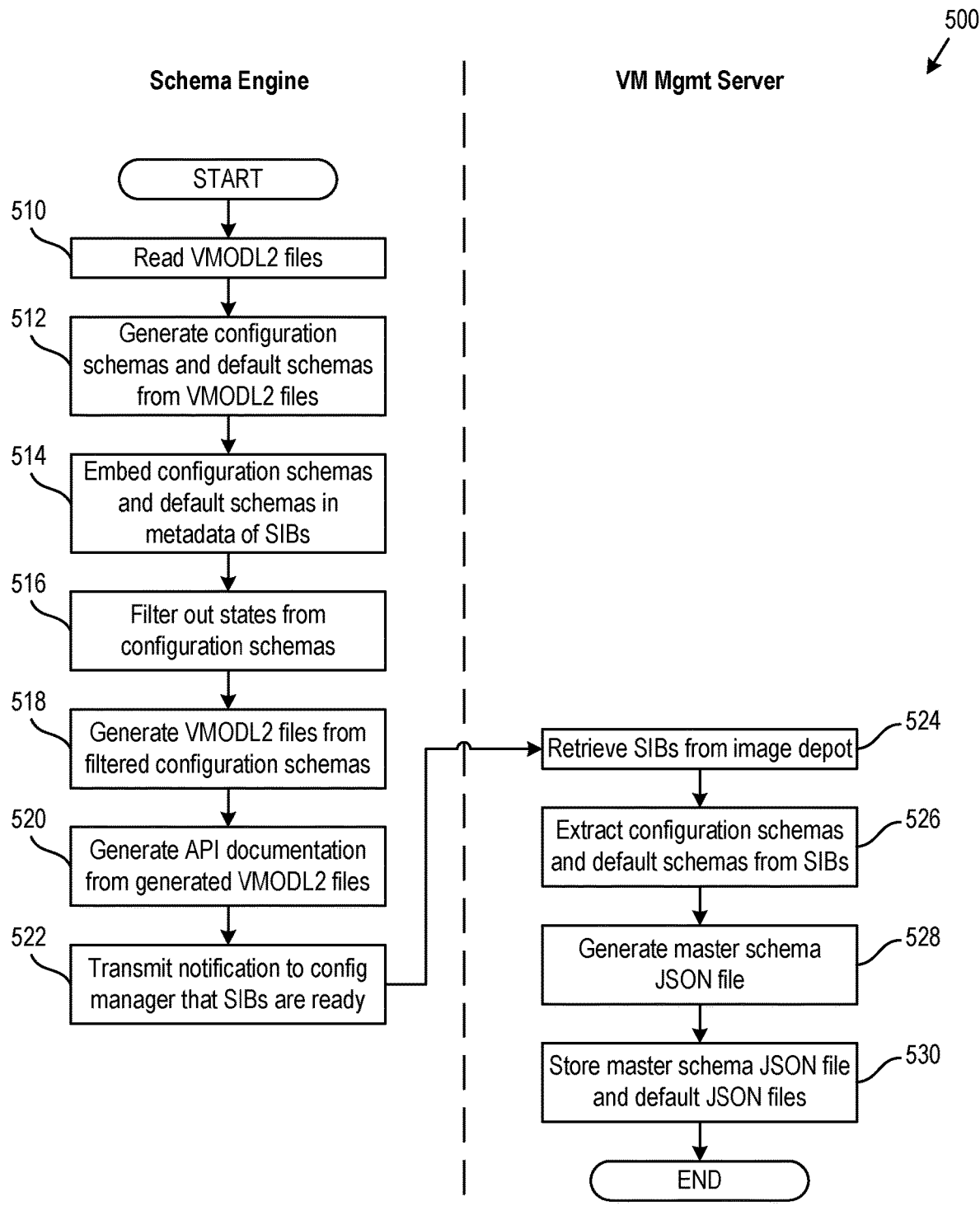
FIG. 5 is a flow diagram of a method carried out by a schema engine and virtual machine management server to embed configuration schemas in metadata of software installation bundles, automatically generate API documentation for APIs that are called to configure system services of a computing system, and generate a master configuration schema, according to an embodiment.

FIG. 5 is a flow diagram of a method 500 carried out by schema engine 310 and VM management server 330 to embed configuration schemas in metadata of SIBs, automatically generate API documentation for APIs that are called to configure system services of computing system 300, and generate master schema JSON file 352, according to an embodiment.

At step 510, schema engine 310 reads VMODL2 files 302 that have been generated by software vendors of the system services. At step 512, schema engine 310 generates configuration schemas and default schemas from VMDOL2 files 302. For example, for the VMODL2 file 302 for system service 1, schema engine 310 generates SS1.schema.json and SS1.default.json.

At step 514, schema engine 310 embeds the configuration schemas and default schemas in the metadata of the SIBs of image depot 320. For example, schema engine 310 embeds copies of SS1.schema.json and SS1.default.json in the metadata of SS1 SIB.

At step 516, schema engine 310 filters out internal states defined in separate copies of the configuration schemas, thus leaving only configuration properties for the associated system services. At step 518, schema engine 310 generates a VMODL2 file from each filtered configuration schema. At step 520, schema engine 310 generates API documentation from the generated VMODL2 files. Specifically, schema engine 310 generates API documentation for set, update, delete, and get API calls for each system service.

At step 522, schema engine 310 transmits a notification to configuration manager 332 that the SIBs of image depot 320 are ready for retrieval of the schemas.

At step 524, configuration manager 332 retrieves the SIBs from image depot 320. At step 526, configuration manager 332 extracts the configuration schemas and default schemas from the SIBs. At step 528, configuration manager 332 generates master schema JSON file 352 from the configuration schemas extracted at step 526 according to the method of FIG. 4.

At step 530, configuration manager 332 stores master schema JSON file 352 and the default JSON files in local storage units 350. After step 530, method 500 ends.

FIG. 6A is an example of desired configuration file 336 and key-value store 360. In the example of FIG. 6A, desired configuration JSON file 336 contains two configuration objects: one for an NTP system service, identified by the key "ntp," and another for a keyboard system service, identified by the key "keyboard." It should be understood that the example of desired configuration file 336 shown in FIG. 6A is simplified for purposes of illustration and actual examples of desired configuration JSON file 336 contain many more configuration objects.

Lines 610 create the NTP configuration object. As shown in lines 612, no values have been set for the NTP configuration object. However, the NTP configuration object contains a "server" configuration property that may be set with a value of type "string." Additionally, as shown in lines 614, the NTP configuration object contains a "drift" vital internal state that may be set with a value of type "double."

Lines 616 create the keyboard configuration object. As shown in lines 618, no values have been set for the keyboard configuration object. However, the keyboard configuration object contains a "layout" configuration property that may be set with a value of type "string." Additionally, the keyboard configuration object may contain one or more internal states (not shown).

Key-value store 360 contains an entry for an NTP configuration object containing a value for the drift internal state. There is no entry for a keyboard configuration object because no values have been set for the keyboard configuration object in desired configuration JSON file 336.

FIG. 6B is an example of desired configuration JSON file 336 after set API commands are executed on the desired configuration JSON file 336 of FIG. 6A. As shown in lines 620, after a set API command is executed on the NTP configuration object, the server configuration property contains the value "time.vmware.com." As shown in lines 622, after a set API command is executed on the keyboard configuration object, the layout configuration property contains the value "US default." After the server and layout configuration properties are set in desired configuration JSON file 336, configuration manager 332 issues an apply API call with desired configuration JSON file 336 to host 340 to match the actual configuration state with the desired configuration state.

FIG. 6C is an example of key-value store 360 after a host 340 executes set API commands in an order specified by the dependency graphs 356 of FIG. 7 in response to the apply API command issued in FIG. 6B. Host configuration manager 342 detects that the server and keyboard system services are in drift, and host configuration manager 342 determines the order to add or modify configuration objects in key-value store 360. The keyboard configuration object must be added to key-value store 360 before the NTP configuration object is modified because the NTP system service is in the System set, while the keyboard system service is in the Independent Configuration set. As defined in FIG. 7, system services in the Independent Configuration set are updated before system services in the System set.

Resultingly, host configuration manager first issues set API call, represented as lines 630, to update key-value store 360 to contain an entry for a keyboard configuration object. As in desired configuration JSON file 336, the keyboard configuration object contains the value "US Default" for the layout configuration property. As such, host 340 runs the keyboard system service with the keyboard configuration property set to US Default.

Later, host configuration manager issues a second set API call, represented as lines 632, to update the NTP configuration object of key-value store 360 to contain the value "time.vmware.com" for the server configuration property. As such, host 340 runs the NTP system service with the server configuration property set to time.vmware.com.

FIG. 6D is an example of desired configuration JSON file 336 and key-value store 360 after an update API command is executed by configuration manager 332 on the desired configuration JSON file 336 of FIG. 6B. As shown in lines 640, after the update API command is executed on desired configuration JSON file 336, the layout configuration property contains the value "Korean."

After the layout configuration property is updated in desired configuration JSON file 336, configuration manager 332 issues an apply API call with desired configuration JSON file 336 to host 340 to match the actual configuration state with the desired configuration state. In response, host configuration manager 342 detects that the system service "keyboard" is in drift, and issues a second update API call, represented as lines 642, to update key-value store 360. The layout configuration property in key-value store 360 is then updated from "US Default" to "Korean."

FIG. 6E is an example of desired configuration JSON file 336 and key-value store 360 after a delete API command is executed by configuration manager 332 on the desired configuration JSON file 336 of FIG. 6D. As shown in lines 650, after the delete API command is executed on desired configuration JSON file 336, the layout configuration property no longer contains a value.

After the layout configuration property is deleted from desired configuration JSON file 336, configuration manager 332 issues an apply API call with desired configuration JSON file 336 to host 340 to match the actual configuration state with the desired configuration state. In response, host configuration manager 342 detects that the system service "keyboard" is in drift, and issues a second delete API call, represented by lines 652, to key-value store 360. The layout configuration property in key-value store 360 is then deleted along with the keyboard configuration object.

FIG. 6F is an example of a result of a get API command executed on desired configuration JSON file 336 of FIG. 6E. The get API command executed in the example of FIG. 6F retrieves configuration properties and internal states for the NTP system service. The result that is returned in response to the get API command includes the server configuration property with the value time.vmware.com and the drift internal state with the value currently stored for the drift state.

FIG. 7 is an example of dependency graphs 356 for the system services running in hosts 340, according to an embodiment. It should be understood that the example of dependency graphs 356 shown in FIG. 7 is simplified for purposes of illustration, and actual examples of dependency graphs 356 contain many more system services and may contain more and/or different sets. The example of FIG. 7 includes four super nodes: "Independent Configuration," "Network," "Storage," and "System."

A high-level dependency graph 710 defines the dependencies among the sets of system services. According to high-level dependency graph 710, the System super node is dependent on the Storage super node, the Storage super node is dependent on the Network super node, and the Network super node is dependent on the Independent Configuration super node. As a result, updates to configurations are applied in the following order: 1. system services of the Independent Configuration super node, 2. system services of the Network super node, 3. system services of the Storage super node, and 4. system services of the System super node.

Additionally, each super node includes a set of system services. The dependencies between system services of a set are defined by inner dependency graphs 720a, 720b, 720c, and 720d, referred to collectively as inner dependency graphs 720. Inner dependency graphs 720 define dependencies among system services whose configurations are child nodes of the same super nodes. For example, according to inner dependency graph 720c of the Storage super node, iSCSI system service is dependent on NFS system service. As a result, updates to configurations at the Storage super node are applied for NFS system service before iSCSI system service.

Figure 8:
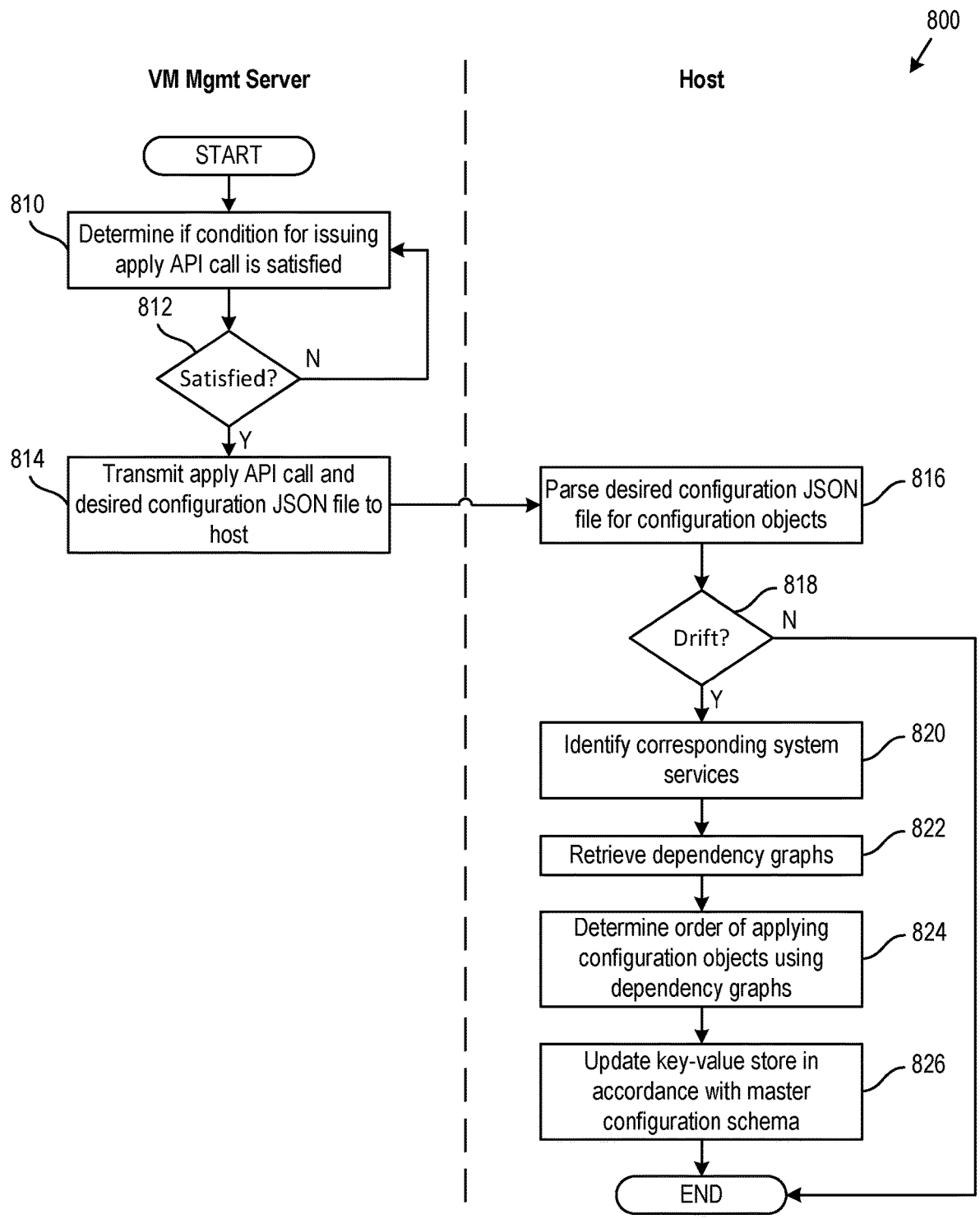
FIG. 8 is a flow diagram of a method carried out by a virtual machine management server and host to persist configurations of a desired configuration JSON file in a key-value store in an order determined from dependency graphs, according to an embodiment.

FIG. 8 is a flow diagram of a method 800 carried out by VM management server 330 and a host 340 to persist configurations of desired configuration JSON file 336 in a key-value store 360 in an order determined from dependency graphs 356, according to an embodiment.

At step 810, configuration manager 332 determines if a condition for issuing an apply API call is satisfied for host 340. The condition for issuing an apply API call may be drift or an update to desired configuration JSON file 336 (e.g., when a user makes one of configuration API calls 306). Configuration manager 332 may periodically transmit a request to a host 340 to check for drift or may transmit a request in response to a user command.

At step 812, if the condition is not satisfied, configuration manager 332 returns to step 810 to check again if the condition for issuing an apply API call is satisfied. If the condition is satisfied, configuration manager 332 at step 814 transmits an apply API call to host 340 along with desired configuration JSON file 336.

At step 816, host configuration manager 342 parses desired configuration JSON file 336 for configuration objects. At step 818, host configuration manager 342 determines if any of the configuration objects are in drift, i.e., the actual state does not match the desired state. If not, method 600 ends. If so, host configuration manager 342 at step 820 identifies the system services corresponding to the configuration objects in drift. For example, configuration objects in the keyboard, NFS, and iSCSI system services may be in drift because configuration properties for those system services contain values in desired configuration JSON file 336 that are different from the values those configuration properties contain in key-value store 360.

At step 822, host configuration manager 342 retrieves dependency graphs 356, e.g., the dependency graphs 356 of FIG. 7. At step 824, host configuration manager 342 determines an order to apply updates to the configuration objects in drift by using dependency graphs 356. For example, using dependency graphs 356 of FIG. 7, the order of updating configurations for the above-mentioned system services are: 1. keyboard system service, 2. NFS system service, and 3. iSCSI system service.

At step 826, host configuration manager 342 executes plug-ins associated with the configuration objects in drift to apply the desired state and update the configuration objects in key-value store 360 in accordance with master schema JSON file 352. If any updates to the configuration objects in key-value store 360 are not in accordance with master schema JSON file 352, host configuration manager 342 returns an error message to configuration manager 332, and method 800 ends.

The updates may include a creation of a key-value entry, an update to an existing key-value entry, or a deletion of an existing key-value entry. To create a key-value entry, a plug-in issues a "set" API command to key-value store 360. To update an existing key-value entry, the plug-in issues an "update" API command to key-value store 360. To delete an existing key-value entry, the plug-in issues a "delete" API command to key-value store 360.

After step 826, method 800 ends, and host 340 runs system services with the updated configurations specified in key-value store 360.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are hard disk drives (HDDs), solid-state drives (SSDs), network-attached storage (NAS) systems, read-only memory (ROM), random-access memory (RAM), compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest operating system (OS) that perform virtualization functions.

Boundaries between components, operations, and local storage units are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of remediating system services to a desired configuration state, wherein the system services are running in a host configured with a virtualization software for supporting execution of virtual machines therein, and the system services include a plurality of sets of system services, said method comprising:
  comparing actual configurations of the system services to desired configurations of the system services to identify configurations that are in drift;
  identifying system services corresponding to the configurations that are in drift including system services in a first set and system services in a second set;
  retrieving a first dependency graph representing dependencies among the sets of system services, wherein, according to the first dependency graph, the first set is dependent on the second set;
  retrieving a plurality of second dependency graphs, wherein each second dependency graph represents dependencies among system services that are in one of the sets of system services;
  determining an order of updating the configurations that are in drift, using the first and second dependency graphs; and
  applying desired configurations of the identified system services corresponding to the configurations that are in drift, in the order determined, wherein desired configurations of the system services in the first set are applied after desired configurations of the system services in the second set, and after the configurations that are in drift are updated to no longer be in drift, the identified system services corresponding to the configurations that are no longer in drift execute with the desired configurations of the identified system services corresponding to the configurations that are no longer in drift.

2. The method of claim 1, wherein the applying of the desired configurations of the identified system services includes:
  updating a configuration database in accordance with a master configuration schema defined for the system services based on a desired configuration file that contains the desired configurations of the system services,
  wherein the configuration database is a key-value database and each of the system services has a corresponding key in the configuration database.

3. The method of claim 2, wherein during said comparing, the actual configurations of the system services are determined from the configuration database, and the desired configurations of the system services are determined from the desired configuration file.

4. The method of claim 2, wherein
  the first set includes storage system services, and the second set includes network system services.

5. The method of claim 4, wherein
  the first set includes a first system service that is dependent on a second system service as specified by the second dependency graph for the storage system services, and
  during said applying, desired configurations for the first system service are applied after desired configurations for the second system service.

6. The method of claim 5, wherein the desired configuration file defines one or more configuration properties of the first system service, one or more internal states of the first system service, one or more configuration properties of the second system service, and one or more internal states of the second system service.

7. The method of claim 1, further comprising:
  generating a master configuration schema from a plurality of individual configuration schemas, each of the individual configuration schemas corresponding to one of the system services,
  wherein the desired configurations of the identified system services corresponding to the configurations that are in drift, are applied in accordance with the master configuration schema.

8. A computing system comprising:
  a cluster of servers each configured with a virtualization software for supporting execution of virtual machines therein, wherein each of the servers includes a plurality of system services running therein, and each of the servers is configured to carry out a method of remediating system services to a desired configuration state, said method comprising:
  comparing actual configurations of the system services to desired configurations of the system services to identify configurations that are in drift;
  identifying system services corresponding to the configurations that are in drift including system services in a first set and system services in a second set;
  retrieving a first dependency graph representing dependencies among sets of system services, wherein, according to the first dependency graph, the first set is dependent on the second set;
  retrieving a plurality of second dependency graphs, wherein each second dependency graph represents dependencies among system services that are in one of the sets of system services;
  determining an order of updating the configurations that are in drift, using the first and second dependency graphs; and
  applying desired configurations of the identified system services corresponding to the configurations that are in drift, in the order determined, wherein desired configurations of the system services in the first set are applied after desired configurations of the system services in the second set, and after the configurations that are in drift are updated to no longer be in drift, the identified system services corresponding to the configurations that are no longer in drift execute with the desired configurations of the identified system services corresponding to the configurations that are no longer in drift.

9. The computing system of claim 8, wherein the applying of the desired configurations of the identified system services includes:
   updating a configuration database in accordance with a master configuration schema defined for the system services based on a desired configuration file that contains the desired configurations of the system services,
   wherein the configuration database is a key-value database and each of the system services has a corresponding key in the configuration database.

10. The computing system of claim 9, wherein during said comparing, the actual configurations of the system services are determined from the configuration database, and the desired configurations of the system services are determined from the desired configuration file.

11. The computing system of claim 9, wherein
   the first set includes storage system services, and the second set includes network system services.

12. The computing system of claim 11, wherein
   the first set includes a first system service that is dependent on a second system service as specified by the second dependency graph for the storage system services, and
   during said applying, desired configurations of the first system service are applied after desired configurations of the second system service.

13. The computing system of claim 12, wherein the desired configuration file defines one or more configuration properties of the first system service, one or more internal states of the first system service, one or more configuration properties of the second system service, and one or more internal states of the second system service.

14. The computing system of claim 8, further comprising:
   generating a master configuration schema from a plurality of individual configuration schemas, each of the individual configuration schemas corresponding to one of the system services,
   wherein the desired configurations of the identified system services corresponding to the configurations that are in drift, are applied in accordance with the master configuration schema.

15. A non-transitory computer readable medium comprising instructions to be executed in one of a plurality of hosts that are each configured with a virtualization software for supporting execution of virtual machines therein, to carry out a method of remediating system services to a desired configuration state, wherein the system services are running in the hosts and include a plurality of sets of system services, said method comprising:
   comparing actual configurations of the system services to desired configurations of the system services to identify configurations that are in drift;
   identifying system services corresponding to the configurations that are in drift including system services in a first set and system services in a second set;
   retrieving a first dependency graph representing dependencies among the sets of system services, wherein, according to the first dependency graph, the first set is dependent on the second set;
   retrieving a plurality of second dependency graphs, wherein each second dependency graph represents dependencies among system services that are in one of the sets of system services;
   determining an order of updating the configurations that are in drift, using the first and second dependency graphs; and
   applying desired configurations of the identified system services corresponding to the configurations that are in drift, in the order determined, wherein desired configurations of the system services in the first set are applied after desired configurations of the system services in the second set, and after the configurations that are in drift are updated to no longer be in drift, the identified system services corresponding to the configurations that are no longer in drift execute with the desired configurations of the identified system services corresponding to the configurations that are no longer in drift.

16. The non-transitory computer readable medium of claim 15, wherein the applying of the desired configurations of the identified system services includes:
   updating a configuration database in accordance with a master configuration schema defined for the system services, based on a desired configuration file that contains the desired configurations of the system services,
   wherein the configuration database is a key-value database and each of the system services has a corresponding key in the configuration database.

17. The non-transitory computer readable medium of claim 16, wherein during said comparing, the actual configurations of the system services are determined from the configuration database, and the desired configurations of the system services are determined from the desired configuration file.

18. The non-transitory computer readable medium of claim 16, wherein
   the first set includes storage system services, and the second set includes network system services.

19. The non-transitory computer readable medium of claim 18, wherein
   the first set includes a first system service that is dependent on a second system service as specified by the second dependency graph for the storage system services, and
   during said applying, desired configurations of the first system service are applied after desired configurations of the second system service.

20. The non-transitory computer readable medium of claim 19, wherein the desired configuration file defines one or more configuration properties of the first system service, one or more internal states of the first system service, one or more configuration properties of the second system service, and one or more internal states of the second system service.

* * * * *